United States Patent [19]

Broyles

[11] Patent Number: 4,965,961
[45] Date of Patent: Oct. 30, 1990

[54] TRELLIS WIRE SUPPORT CLIP AND METHOD OF ADAPTING METAL GRAPE STAKE FOR VERTICAL TRELLISING

[76] Inventor: Harry C. Broyles, 6840 Oak La., Placerville, Calif. 95667

[21] Appl. No.: 312,466

[22] Filed: Feb. 21, 1989

[51] Int. Cl.⁵ .......................................... A01Q 17/06
[52] U.S. Cl. ........................................ 47/46; 256/10; 256/48
[58] Field of Search ................ 47/46, 47, 44; 211/119.01; 174/158 F; 248/68.1, 218.4, 219.2, 219.3; 256/10, 48; 403/397

[56] References Cited

U.S. PATENT DOCUMENTS

| D. 280,794 | 10/1985 | Evans | 47/46 X |
|---|---|---|---|
| 356,139 | 0/1887 | Knox | 47/46 |
| 1,444,641 | 2/1923 | Rowe | 256/48 |
| 3,807,089 | 4/1974 | Senese | 248/219.2 X |
| 3,820,758 | 6/1974 | Berg et al. | 256/10 |
| 4,077,611 | 3/1978 | Wilson | 256/10 |

FOREIGN PATENT DOCUMENTS

| 0141469 | 5/1985 | European Pat. Off. | 47/46 |
|---|---|---|---|
| 2004082 | of 1971 | Fed. Rep. of Germany | 47/46 |
| 2574246 | 6/1986 | France | 47/46 |
| 770742 | 11/1943 | Norway | 47/46 |

OTHER PUBLICATIONS

Ebro-Espalier System, Roger Evans, 1983.

*Primary Examiner*—Henry E. Raduazo
*Assistant Examiner*—Jerrold D. Johnson
*Attorney, Agent, or Firm*—Flehr, Hohbach, Test, Albritton & Herbert

[57] ABSTRACT

A trellis wire support assembly for use with metal grape stakes including aa metal trellis wire support clip and a fastener which secures the clip to the grape stake. The clip is formed with a securement portion having a clip shoulder which engages a vertically extending stake shoulder. Extending from the ends of the securement portion of the clip are trellis wire support portions which are preferably slotted to movably receive trellis wires. The slots are formed so that the trellis wires will not be lifted out of the clip during growing of the grapewine foliage. A method of adapting metal grape stakes to vertical trellising using the clip is also disclosed.

8 Claims, 2 Drawing Sheets

TRELLIS WIRE SUPPORT CLIP AND METHOD OF ADAPTING METAL GRAPE STAKE FOR VERTICAL TRELLISING

TECHNICAL FIELD

The present invention relates, in general, to apparatus for supporting trellis wires, and more particularly, relates to trellis wire support assemblies and methods for vertical trellising of plant foliage such as grapevines.

BACKGROUND ART

For many years grapevines have been supported from various combinations of grape stakes and trellis wires that are arranged to permit lateral branching of the grapevine canes from the central vine root stock. More recently, however, it has been discovered that greater fruit production can be achieved if the grapevine foliage is vertically trellised, i.e., encouraged to grow in a vertical plane generally aligned with the grapevine trunk.

Support of grapevine foliage and fruit in a vertical trellising system has been previously accomplished by using pairs of foliage support wires that are positioned on either side of relatively wide grape stakes. Thus, for example, four inch wide wooden grape stakes can be positioned at about 25 foot intervals. Pairs of nails are driven into opposite sides of each stake at several selected heights so that pairs of movable trellis wires can be lifted up from the base of the stake and supported on adjacent pairs of nails. Most typically, at least two pairs of movable trellis wires are mounted and extend along the stakes. The system usually further includes permanent wires to support the canes or the Cordon intermediate and below the movable trellis wires in a position to support the fruit. In some systems, a third set of trellis wires is located below the first two pairs so as to enable training of foliage for growth in a plane both above and below the primary cane branches from the trunk.

In most of the vertical trellising systems, the nails are provided at more than two heights so that the movable trellis wires can be adjusted over the growing season by simply lifting them from one pair of nails to another. Typically, the pairs of trellis wire support nails are positioned at about 8 to 16 inch intervals above and below the permanent Cordon or fruiting wires and about that interval from each other. Depending upon the variety of the grapevines involved, the permanent wires are located at about 2½ to 3½ feet above the ground.

For many years, however, the vast majority of vineyard owners have employed horizontal trellising systems. Accordingly, many grape growers have grape stake and trellis systems which are already installed and are set up for horizontal branching of the grapevine foliage. Conversion of such a horizontal trellising system to a vertical trellising system is not difficult, however, if the grower has wooden grape stakes. Vertical trellising can be accomplished by removing lateral arms from the grape stakes and by adding trellis wire support nails to the sides of the grape stakes.

A complicating factor in the conversion from horizontal trellising to vertical trellising is that there has been a strong movement by growers toward the use of metal grape stakes instead of wooden stakes. Metal stakes have had certain performance advantages over wooden stakes and at least arguable structural and useful life advantages with respect to wooden stakes.

Conversion of metal grape stake horizontal trellising systems to vertical trellising systems is, however, much more difficult than when one tries to convert a wooden grape stake system. While some metal grape stakes are not high strength steel stakes, the addition of a trellis wire support structure to steel grape stakes in the field can be quite time consuming and expensive. Thus, the cost of converting a vineyard having metal grape stakes to vertical trellising can essentially offset the increased production that vertical trellising brings.

Accordingly, it is an object of the present invention to provide a trellis wire support apparatus and method which is suitable for use in converting metal grape stakes to vertical trellising of grapevines.

Another object of the present invention is to provide a trellis wire support clip which may be easily added in the field to previously installed metal grape stakes.

Still a further object of the present invention is to provide a trellis wire support clip for a vertical trellising system which is durable, compact, and has a minimum number of components.

Still a further object of the present invention is to provide a trellis wire support system in which trellis wires can be removably mounted to and lifted from the support clip by machine and yet will not be lifted off of the support clip by the wind.

Still another object of the present invention is to provide a method for supporting trellis wires for vertical trellising of grapevines from metal grape stakes.

Still a further object of the present invention is to provide a trellis wire support clip which can withstand substantial loading.

A further object of the present invention is to provide a trellis wire support clip having a structure which can be adapted for use with commonly employed metal grape stakes.

The trellis wire support clip and method of the present invention have other objects and features of advantage which will become apparent from and are set forth in more detail in the Best Mode Of Carrying Out The Invention and the accompanying drawing.

DISCLOSURE OF THE INVENTION

The trellis wire support assembly of the present invention is comprised, briefly, of a metal stake including a vertically extending stake shoulder, a metal trellis wire support clip having securement portion abutting the stake and including a clip shoulder engaging the stake shoulder. The clip also has an end portion extending from the securement portion laterally of the stake, and fastening means secure the clip to the stake for cooperative engagement of the clip shoulder with the stake shoulder. Finally, means for support of the trellis wire on the end portion of the clip is provided. The clip shoulder on the securement portion of the clip cooperatively engages the vertically extending stake shoulder to enable cantilevered support of the trellis wire on the end portion of the clip. Securement is preferably accomplished by a self-drilling sheet metal screw which forms and taps the hole in the stake when driven into the grape stake using a power drill. Alternatively, a hole can be pre-punched in the stake and a self-tapping sheet metal screw used to secure the clip. In the preferred form, the trellis wire support clip includes a pair of end portions which extend laterally from opposed ends of the securement portion, and each end portion is formed with a slot which opens to an upper side of the clip for removable securement of two trellis wires to the clip.

The method of the present invention comprises, briefly, the steps of mounting a trellis wire support clip extending outwardly from at least one side of a metal grape stake by driving a self-drilling or self-tapping sheet metal screw positioned in an opening in a securement portion of a support clip into the stake until the securement portion of the clip is secured in abutting engagement with the stake so that a vertically extending stake shoulder and a corresponding clip shoulder are interengaged to resist torsion when the trellis wire is supported on the clip.

BEST MODE OF CARRYING OUT THE INVENTION

The trellis wire support clip and method of the present invention can be used for the trellising of virtually any climbing plant, but they are particularly well suited for use in the vertical trellising of grapevines. Accordingly, while the construction and operation of the present trellis wire support clip has been described in the context of the grape vineyard, it will be understood that the clip and method of the present invention have other applications.

Figure 2:
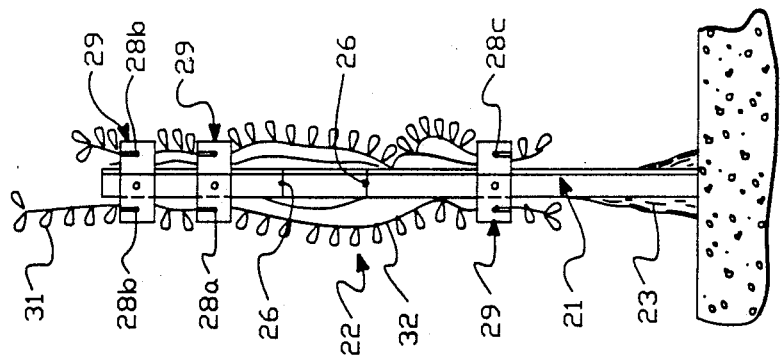
FIG. 2 is an end elevation view of the vertical trellising system of FIG. 1.
Figure 1:
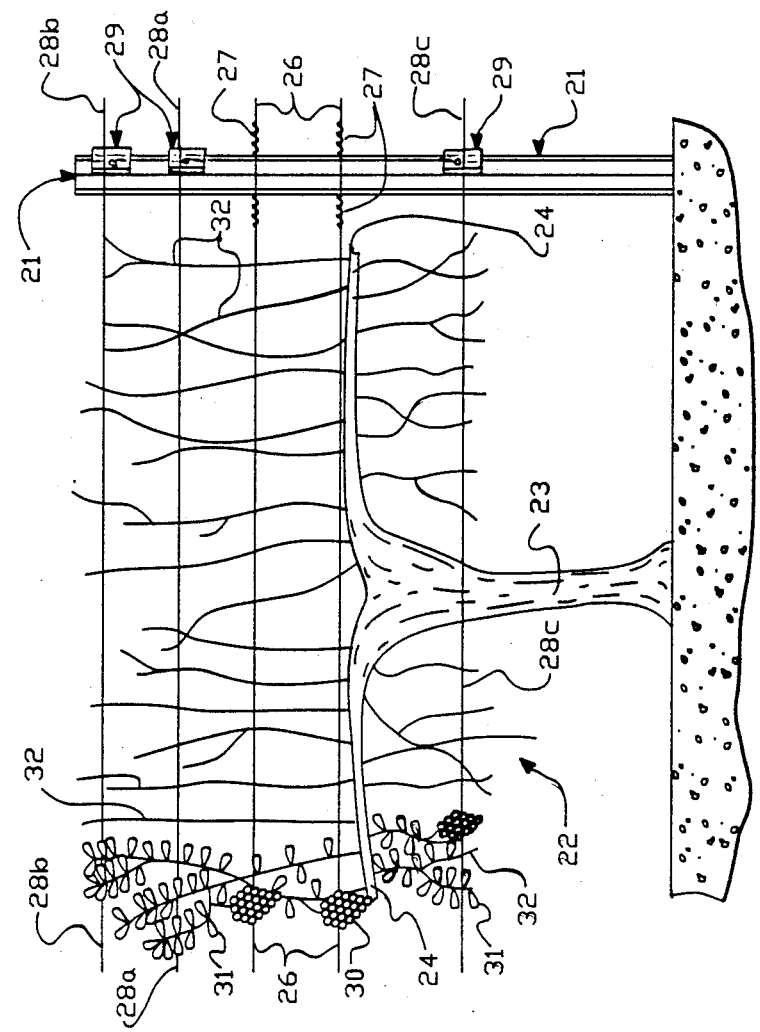
FIG. 1 is a side elevation view of a grapevine having its branches supported by a vertical trellis system constructed in accordance with the present invention.

Referring to FIGS. 1 and 2, a typical vertical trellising system for grapes is shown. The system includes grape stakes 21 which are positioned periodically along the length of a row of grapevines 22. Grape stakes 21 may be positioned at about five to about thirty foot intervals, with the spacing between stakes being determined in part by the individual grower and in part by the variety of the vines. Grapevines 22 include a lower trunk portion 23 and are shown in the drawing as being pruned according to the Cordon system, with a bifurcated upper trunk portion 24, which extends along the row from either side of lower trunk 23. Each vine is pruned each year back to the Cordon spurs or canes. The canes 32 on which the foliage and fruit are carried will sprout each year from the primary canes in a somewhat random fashion, but they are pruned and oriented to grow in a substantially vertical plane by a plurality of trellis wires, which are supported between grape stakes 21. (For ease of understanding, foliage 31 is shown on only some of canes 32.)

In the typical arrangement, permanent or Cordon wires 26 extend between grape stakes 21 and are secured at a height proximate, and are above upper trunk portions 24. Thus, each of the permanent wires 26 can be wrapped around and tied off at 27 so that they are secured to the grape stakes and are capable of supporting a majority of the weight of the fruit. The permanent wires generally are single wires and are not intended primarily for foliage training or control, but instead are primarily structural members.

As shown in FIGS. 1 and 2, the movable trellis wire system includes three pairs of horizontally extending, movable, trellis wires 28a, 28b and 28c.

A pair of trellis wires 28c are located below the lowermost Cordon wire 26 and below primary branches or canes 24. Trellis wires 28a–28c are removably supported on grape stake 21 by trellis wire support clips, generally designated 29, which clips are constructed in accordance with the present invention. As best may be seen in FIG. 2, the support clips 29 extend laterally from both sides of grape stake 21 by only a short distance so that the trellis wires 28a–28c are held or spaced in relatively close relation. The distance between trellis wires typically will be between about 2½ inches to about 6 inches, although some greater spacing may be required in special applications. The result of the close spacing between trellis wires is that leaves or foliage 31 and annual canes 32 are held by the trellis wires in a relatively compact, vertically oriented plane.

It has been found that vertical trellising of the type shown in FIGS. 1 and 2 will produce more fruit than previous horizontal grape trellising techniques. Accordingly, there is considerable interest among grape growers to convert their existing vineyards from the conventional lateral or horizontal trellising to vertical trellising.

The movable trellis wires 28a–28c are initially placed on either side of the bases of the grape stakes, that is, the trellis wires 28a–28c lie on the ground in pairs on either side of grape stakes 21. As the annual canes 32 sprout from upper trunks 24, the grower can prune some of the foliage to encourage and permit canes 32 which are vertically oriented to grow. Once the canes have reached a predetermined height, a pair of movable trellis wires 28a can be lifted up from the ground and raised along the stake to the position shown in FIGS. 1 and 2. Pairs of wires 28a are then mounted to support clips 29 to trap the growing canes therebetween. Similarly, a second pair of movable trellis wires 28c can be raised to the position shown in FIGS. 1 and 2 to trap the downwardly growing annual canes 32. After further growth, the third pair of trellis wires 28b can be raised up the stakes and mounted in the uppermost clip 29 to assist in maintaining the foliage in a vertical plane. As will be appreciated, the permanent wires 26 similarly have some effect in this training process, but they are not provided in pairs to enclose canes 32. Permanent wires 26 are positioned to engage and support bunches of grapes 30, as they mature on the vines.

Conversion from horizontal trellising of vineyard to vertical trellising merely requires the grower to remove any long trellis wire support arms which may be carried by stakes 21 and to provide trellis wire mounting means on stakes 21 for support of trellis wires 28a–28c. This can be readily accomplished if stakes 21 are wooden grape stakes. Pairs of nails may be driven into opposite sides of the wooden grape stakes at the desired heights for support of trellis wires on opposite sides of the grape stakes. The widespread use of steel grape stakes, however, has made the conversion to vertical trellising more difficult.

Figure 4:
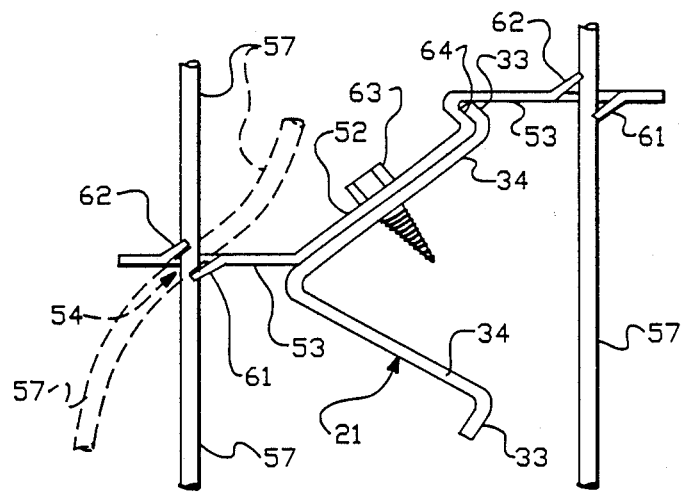
FIG. 4 is a top plan view of the clip of FIG. 3 shown mounted to the form of metal grape stake shown in FIG. 1.
Figure 5:
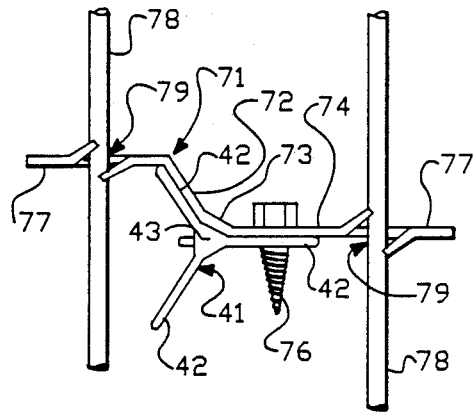
FIG. 5 is a top plan view, in somewhat reduced scale, of an alternative embodiment of the trellis wire support clip mounted to an alternative form of metal grape stake.

Two types of steel grape stakes which are in widespread use in vineyards, particularly in California, are shown in FIGS. 4 and 5. The majority of steel grape stakes have a V-shaped cross section as shown for grape stake 21 in FIG. 4. V-shaped grape stake 21 typically will have a height of about 7 to 8 feet with approximately 2 feet being driven into the ground. The V-shape cross section gives the stake a high degree of strength, while still minimizing the amount of material in the stake.

A second form of metal grape stake 41 is shown in FIG. 5. The cross section of this grape stake takes the form of three legs 42 which extend laterally from a central base 43 at 120 degree intervals. This structure is highly stable, but requires a somewhat greater amount of material and is less widely used than metal grape stake 21.

Regardless of the cross section of the metal grape stake which is being used, metal grape stakes generally pose a serious barrier to conversion of a vineyard from horizontal to vertical trellising because it is not possible to nail attachments to the metal stakes. While welding or soldering could be employed, the selected system must be capable of installation in the field without the use of complicated tools or time consuming procedures. The advantages of vertical trellising will not be sought if the system for modifying the metal grape stakes to vertical trellising is too costly.

The trellis wire support clip of the present invention provides a device which can be readily fastened to a metal grape stake using only a single self-drilling or self-tapping sheet metal screw. Notwithstanding the fact that a single screw can be used to fasten the clip to a stake, the clip is constructed so that once mounted to the grape stake it cooperates with the surfaces on the grape stake to lock the clip against rotation about a horizontal axis. Thus, a high strength support structure can be easily added to metal grape stakes.

Figure 3:
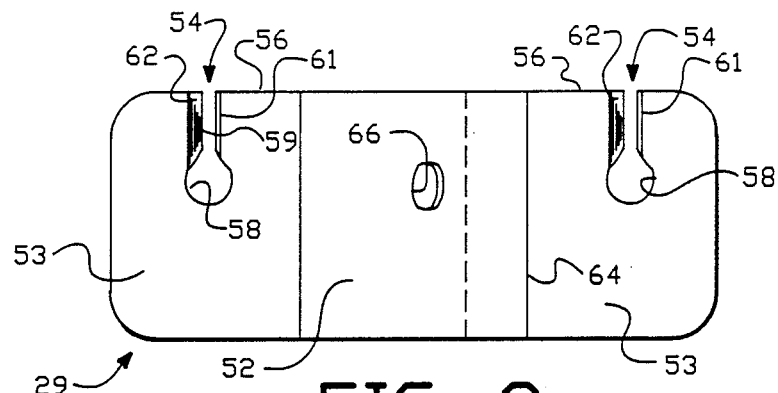
FIG. 3 is an enlarged, side elevation view of a trellis wire support clip constructed in accordance with the present invention.

The preferred construction of trellis wire support clip 29 of the present invention can best be seen by reference to FIGS. 3 and 4. Support clip 29 has a body having a central securement portion 52 from which at least one, preferably two, trellis wire support portions or ends 53 extend. Trellis wire support portions 53 are each formed for support of a trellis wire thereon in spaced relation to the central securement portion 52.

In the preferred form of clip 29 shown in FIG. 3, slot means 54 open to an upwardly facing edge 56 of the trellis wire support portions 53. Each of slots 54 includes means for restraining the trellis wires 57 from being lifted by the wind vertically out of the slots, and yet permits machine implemented removal or lifting of the trellis wires from the slots. As shown in FIGS. 3 and 4, slots 54 are constructed with an enlarged tear-shaped opening portion 58 which is connected to a reduced neck or passageway portion 59. The passageway portion 59 is defined by a pair of opposed ears 61 and 62, which are bent slightly from the plane of the support ends 53 in opposite directions (see FIG. 4).

Trellis wires 57, therefore, can be passed from the top edge 56 of the support end 53 down neck 59 and to enlarged opening 58 by rotating the trellis wire about a vertical axis from a support orientation (solid lines) to a release orientation (dotted lines) as shown in FIG. 4. Once trellis wire 57 moves beyond ears 61 and 62 and is rotated back to its normal or support orientation, the trellis wire is trapped by ears 61 and 62 in opening 58 and cannot merely be vertically lifted out of the opening by wind loading. As will be appreciated, vertical trellising of grape vines creates a sail-like structure which can apply a significant lifting force to the movable trellis wires. It should be noted that clips 29 also may be used with the slots 54 facing downwardly, and the slot construction insures that the canes will not displace the trellis wires down out of slots 54 under wind loading.

After harvesting, the grower will want to remove the movable trellis wires from clips 29. This can be machine implemented with the present clips as a result of the tear-drop shape of openings 58. A tractor mounted wheel having a groove receiving the movable trellis wires can be used to engage and lift the wires vertically. About 60 pounds of upward force on the wires, when combined with the tapering surfaces at the top of tear-drop opening 58, will cam the wires toward the dotted line release orientation of FIG. 4 and allow the wires to escape or be lifted from slot means 54. Wind loading, however, is not sufficient to produce enough camming and rotation of the wire to permit their disengagement from slots 54. Once the trellis wire is supported on the wheel at a height sufficient to cam and pull the wire out of slots 54, the tractor can be advanced down the field and the wheel will essentially rip the movable wires out of the clip slots so that the movable wires may be placed on the ground next to the grape stakes until next season.

It is an important feature of the trellis wire support clip of the present invention that clip 29 can be mounted to a metal grape stake with a single fastener and yet is capable of supporting substantial cantilevered loads at the clip supporting slots 54. Central securement portion 52 of the clip is formed to cooperatively engage a side of vertically extending grape stake 21 in a manner which prevents rotation of the clip about a horizontal axis relative to the stake, once the clip is fastened to the stake by fastening means, such as a self-drilling or self-tapping sheet metal screw 63.

In the preferred form of FIGS. 3 and 4, central securement portion 52 includes a generally planar surface which abuts one of legs 34 of the V-shaped grape stake. The securement portion also includes a longitudinally extending clip shoulder 64, or a V-shaped bend, which mates with a longitudinally extending stake shoulder, here provided by edge flange 33 of stake 21. Thus, the edge flange 33 and leg 34 provide two surfaces lying in intersecting planes against which clip 29 can be secured. A single fastener 63 passing through fastener receiving opening 66 in the securement portion 52 of the clip draws the clip down against leg 34 and edge flange 33. Fastener 63 locks the clip in place against rotation about a horizontal axis through fastener 63. Substantial loading of either of the trellis wire support ends 53 will not rotate the clip about the fastener.

In the preferred form of clip 29, the clip is formed from a strip of sheet metal which is appropriately bent so as to conform to intersecting surfaces of the metal grape stake. Clip 29 is further bent so that the ends 53, which support the trellis wires, extend out from the securement portion of the clip at angles which will position ends 53 in a generally normal orientation to trellis wires 67, as shown in FIGS. 4 and 5.

The use of a self-drilling or self-tapping sheet metal screw greatly facilitates the installation of clips 29. When retro-fitting existing stakes in the field, a self-drilling or hole-boring and tapping sheet metal screw 63 can be placed in a pneumatic or electric power drill bit. Clip 29 can be held up against the grape stake with the shoulder 64 nested against edge flange 33. The installer then drills screw 63 through opening 66 in the clip and into and through leg 34 of the grape stake. The self-drilling screw forms the hole in the stake, as well as tapping the hole as it is being formed. The entire process takes only a few seconds and requires only a power drill of the type commonly owned by growers and easily transported and used in the field. To add three clips to a stake, therefore, is a relatively simple process which can be readily accomplished by relatively unskilled labor.

When stakes are to be newly installed in a vineyard, the stakes may be pre-punched with an opening to receive fastener 63. If pre-punched, fastener 63 need only be a self-tapping fastener.

A similar trellis wire support clip construction can be used with the grape stake 41 of FIG. 5. As may be seen in FIG. 5, clip 71 has a central portion with three planar sections 72, 73 and 74 which mate with legs 42 and central body 43 of grape stake 41. One of planar areas 72 and 74 is formed with an opening (not shown) and a self-drilling or self-tapping sheet metal screw 76 is used to cinch the clip against the grape stake. The angled surfaces 72, 73 and 74 prevent rotation of the clip about fastener 76, and a single fastener again may be used to secure clip 71 to stake 41. As previously described, ends 77 which support trellis wires 78 are preferably formed with slot means 79 which provide for removable mounting of the trellis wires to the trellis wire support clip. Support ends 77 of the clip again extend away from the securement portion at angles which orient the support ends at about right angles to trellis wires 78. The slots 79 are configured, e.g., with ears, to prevent removal of the trellis wires without some manipulation of the same, for example, by rotating the trellis wires to align them with the ears defining the slots.

Installation of clip 71 of FIG. 5 is accomplished in the manner identical to the installation of clip 29. One need only to hold the clip against the stake while a power drill is used to drive self-drilling or self-tapping screw fastener 76 through one of legs 42.

It should be noted that while it is possible to pre-drill a hole in the metal grape stakes and thereafter couple the clips of the present invention to the stake by a bolt and nut, or even by a sheet metal screw, the use of a self-tapping or self-drilling screw allows the clip securement process to take place using only one operation. The use of a self-drilling or self-tapping screw also avoids the necessity for multiple fastener parts, as would be required for a nut and bolt assembly. While grape stakes are formed from steel, the steel used is only 12 to 17 gauge steel and it is not a high alloy steel. Accordingly, driving the self-drilling screw directly into the stake in a retro-fitting operation without pre-drilling a bore is quite easily accomplished.

As will be apparent from the above description, the method of adapting a metal grape stake for vertical trellising of the grapevines of the present invention includes the step of mounting a trellis wire support clip to the metal grape stake by driving a self-drilling or self-tapping sheet metal screw into the stake until at least two areas of a securement portion of the clip are secured in abutting engagement with two surfaces on the metal grape stake. Thereafter, the method includes the step of supporting a trellis wire on the clip at a position proximate and alongside of the grape stake. In the most preferred form, the clips are capable of supporting a trellis wire on either side of the grape stake, and the supporting step includes supporting pairs of trellis wires on opposite ends of the clip after mounting the clip to the metal grape stake by a single fastener.

Using the clips of the present invention and the method of the present invention, it is possible to convert metal grape stakes to vertical trellising at a cost of approximately $450.00 per acre, of which about two-thirds represents the approximate cost of the clips and fasteners, while about one-third represents the cost of the labor involved to install three clips per grape stake. In some vineyards a two clip system is employed, with the lower trellis wire 28c being eliminated. In such instances, the cost per acre is reduced by about one-third.

What is claimed is:

1. A trellis wire support clip for mounting on a side of a stake having a vertically extending stake shoulder means, said support clip comprising:

a one-piece clip body having a securement portion formed for mounting to said stake from a side thereof and formed to extend around said stake by an amount less than the entire periphery of said stake, said body further having a trellis wire support portion, said trellis wire support portion being formed for support of a trellis wire thereon in spaced relation to said securement portion, and said securement portion being formed for receipt of fastening means therethrough, and said securement portion having a vertically extending clip shoulder means shaped to cooperatively engage without penetrating said stake shoulder means when mounted thereto for interengagement of said clip shoulder means and said stake shoulder means in a manner cooperating with said fastening means to prevent rotation of said clip about a horizontal axis relative to said stake for cantilevered support of the trellis wire on said support portion relative to said side of said stake.

2. A trellis wire support clip as defined in claim 1 wherein, said support portion is formed with slot means for releasable mounting of a trellis wire in a support orientation on said clip, said slot means is provided by a neck portion extending to an enlarged opening, said neck portion being formed and dimensioned to pass said trellis wire therethrough only upon manipulation of said trellis wire from said support orientation to a displaced release orientation, and said enlarged opening being defined in part by surfaces tapering toward said neck portion for camming of said trellis wire from said support orientation to said release orientation upon displacement of said trellis wire against said surfaces.

3. A trellis wire support clip as defined in claim 1 wherein, said slot means open to an upwardly facing edge of said support portions and include a tear-shaped enlarged opening and a reduced neck portion extending away from the narrow end of said tear-shaped opening.

4. A trellis wire support clip formed for mounting to a grape stake having a body with a V-shaped horizontal cross section and vertically extending flange edge extending at an angle to said body comprising:

a clip body formed from a flat elongated sheet metal strip, and having a central securement portion and opposed trellis wire support ends extending laterally from said securement portion;

each of said support ends being formed with a slot therein opening to an edge of said strip and dimensioned to receive a trellis wire therein;

said securement portion is formed with an L-shaped horizontal cross section defining a vertically extending clip portion with one leg extending from said clip shoulder to abut and cooperatively engage a side of said body of a V-shaped grape stake over a vertical height of said stake and a second leg oriented at an angle to said first leg and extending from said clip shoulder to abut said flange edge of the V-shaped grape stake over a vertical height of said stake in order to resist rotation of said clip body about a horizontal axis;

said one leg has an opening therein to receive a screw fastener therethrough; and said support ends extends from said L-shaped section at angles orienting said ends substantially perpendicular to the nominal orientation of the trellis wires as supported by said clip to support said trellis wires in laterally spaced relation relative to the grape stake.

5. A trellis wire support assembly comprising:
a metal stake having a vertically extending stake shoulder means;
a metal trellis wire support clip having a one-piece body shaped for mounting to said stake from one side thereof, said clip being mounted to said one side of said stake and extending around less than the entire periphery of said stake, and said body having a clip shoulder means and an end portion extending laterally of said stake;

fastening means extending through said body from an outside of said clip and into said stake and positively securing said clip to said stake with said clip shoulder means cooperatively engaged with said stake shoulder means to prevent rotation of said clip relative to said fastening means; and means for support of a trellis wire on said end portion.

6. The trellis wire support assembly as defined in claim 5 wherein,
said stake is a stake having a V-shaped cross section with said stake shoulder being provided by a laterally extending edge of one leg of said V-shaped cross section; and
said body includes an area engaging said one leg and a contiguous stepped clip shoulder engaging said edge.

7. The trellis wire assembly as defined in claim 5, wherein,
said fastening means is a self-drilling screw formed for simultaneous boring and tapping of a hole in said metal stake; and
said body of said clip is pre-formed with an opening therein receiving said self-drilling screw.

8. The trellis wire assembly as defined in claim 5 wherein,
said clip includes a pair of end portions extending laterally of said stake from opposite ends of said body, each of said end portions including slot means dimensioned for receipt of a trellis wire therein for support of the trellis wire on each of said ends.

* * * * *

UNITED STATES PATENT AND TRADEMARK OFFICE
CERTIFICATE OF CORRECTION

PATENT NO. : REEXAMINATION CERTIFICATE (1689th) B1 4,965,961
Reexamination Request No. 90/002,422, August 30, 1991
DATED : Certificate Issued April 28, 1992
INVENTOR(S) : Harry C. Broyles It is certified that error appears in the above-identified patent and that said Letters Patent is hereby corrected as shown below:

ON TITLE PAGE:

below "230608    4/1963    Austria    256/47"
        insert ---OTHER DOCUMENTS
        Solidite-Longevite Column 1, line 15, insert ---The patentability of claim 4 is confirmed.---.

Column 1, line 19, delete ", 4".

Signed and Sealed this

Twenty-first Day of July, 1992

*Attest:*

DOUGLAS B. COMER

*Attesting Officer*          *Acting Commissioner of Patents and Trademarks*

REEXAMINATION CERTIFICATE (1689th)
United States Patent [19]
Broyles

[11] B1 4,965,961
[45] Certificate Issued Apr. 28, 1992

[54] TRELLIS WIRE SUPPORT CLIP AND METHOD OF ADAPTING METAL GRAPE STAKE FOR VERTICAL TRELLISING

[76] Inventor: Harry C. Broyles, 6840 Oak La., Placerville, Calif. 95667

Reexamination Request:
No. 90/002,422, Aug. 30, 1991

Reexamination Certificate for:
Patent No.: 4,965,961
Issued: Oct. 30, 1990
Appl. No.: 312,466
Filed: Feb. 21, 1989

[51] Int. Cl.⁵ .............................................. A01G 17/04
[52] U.S. Cl. ........................................ 47/46; 256/10; 256/48
[58] Field of Search .................... 256/47, 48, 54, 46; 47/46, 47, 44; 211/119.01

[56] References Cited

U.S. PATENT DOCUMENTS

| 444,331 | 1/1891 | Christ | 256/48 |
| 2,052,774 | 9/1936 | Kundert | 256/47 |
| 2,067,688 | 1/1937 | Weber | 256/48 |
| 3,411,754 | 11/1968 | Fahrenholz | 256/48 |
| 3,874,640 | 4/1975 | Wagner | 256/47 |
| 3,908,964 | 9/1975 | Leiblich | 256/47 |

FOREIGN PATENT DOCUMENTS

230608  4/1963  Austria .......................... 256/47

*Primary Examiner*—Henry E. Raduazo

[57] ABSTRACT

A trellis wire support assembly for use with metal grape stakes including a metal trellis wire support clip and a fastener which secures the clip to the grape stake. The clip is formed with a securement portion having a clip shoulder which engages a vertically extending stake shoulder. Extending from the ends of the securement portion of the clip are trellis wire support portions which are preferably slotted to movably receive trellis wires. The slots are formed so that the trellis wires will not be lifted out of the clip during growing of the grapewine foliage. A method of adapting metal grape stakes to vertical trellising using the clip is also disclosed.

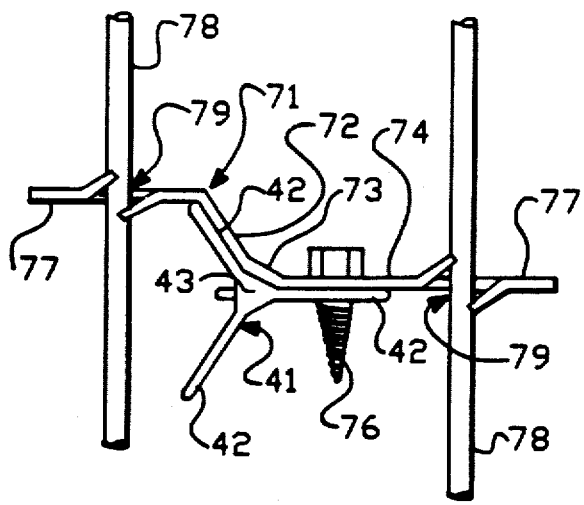

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3 and 5 are determined to be patentable as amended.

Claims 2, 4 and 6–8, dependent on an amended claim, are determined to be patentable.

New claim 9 is added and determined to be patentable.

1. A trellis wire support clip for mounting on a side of a stake *for support of a length of trellis wire therefrom, said stake having a width dimension transverse to the length of wire and having* vertically extending stake shoulder means *defined by at least two surfaces lying on intersecting planes*, said support clip comprising:
   a one-piece clip body having a securement portion formed for mounting to said stake from a side thereof and formed to extend around said stake by an amount *sufficient to engage said stake at positions spaced apart by substantially the full width dimension of said stake and* less than the entire periphery of said stake, said body further having a trellis wire support portion *extending from said securement portion*,
   said trellis wire support portion being formed for support of a trellis wire thereon in spaced relation to said securement portion, and
   said [securement portion] *clip body* being formed for receipt of fastening means therethrough, and said securement portion having a vertically extending clip shoulder means shaped to cooperatively engage *said two surfaces lying on intersecting planes* without penetrating said stake shoulder means when mounted thereto for interengagement of said clip shoulder means and said stake shoulder means in a manner cooperating with said fastening means to prevent rotation of said clip about a horizontal axis relative to said stake for cantilevered support of the trellis wire on said support portion relative to said side of said stake.

3. A trellis wire support clip as defined in claim [1] *2* wherein,
   said slot means open to an upwardly facing edge of said support portions and include a tear-shaped enlarged opening *having an upper narrow end* and a reduced neck portion extending away from the narrow end of said tear-shaped opening.

5. A trellis wire support assembly comprising:
   a metal stake having *a width dimension and* a vertically extending stake shoulder means *defined by at least two stake surfaces lying on intersecting planes*,
   a metal trellis wire support clip having a one-piece body shaped for mounting to said stake from one side thereof, said clip being mounted to said one side of said stake and extending around less than the entire periphery of said stake [and] *and being in abutting contact with said stake across said width dimension, and said clip* said body having a clip shoulder means and an end portion extending laterally of said stake;
   fastening means extending through said body from an outside of said clip and into said stake and positively securing said clip to said stake with said clip shoulder means cooperatively engaged with said *two stake surfaces defining* stake shoulder means to prevent rotation of said clip relative to said fastening means; and
   means for support of a trellis wire on said end portion.

9. *A trellis wire support clip for mounting on a side of a stake to support a length of trellis wire from said stake, said stake having a width dimension transverse to the length of said trellis wire and said stake having a vertically extending stake shoulder means defined by two intersecting planes on said stake, said support clip comprising:*
   *a one-piece clip body having a central securement portion formed to extend across said width dimension for mounting to said stake from a side thereof with said securement portion in contact with said stake proximate opposite sides of said width dimension, and said securement portion further being formed to extend around said stake by an amount less than the entire periphery of said stake, and said body further having a pair of trellis wire support portions with one support portion on either side of said securement portion;*
   *said trellis wire support portions being formed for support of a trellis wire thereon in spaced relation to said securement portion and in spaced relation to opposite sides of said stake; and*
   *said clip body being formed with at least one opening for receipt of fastening means therethrough, and said clip body being formed with two vertically extending surfaces lying on intersecting planes to provide clip shoulder means positioned between said trellis wire support portions and said fastening means, said clip shoulder means cooperatively engaging, without penetrating, said two intersecting planes of said stake shoulder means when mounted thereto in a manner pulling said clip toward said stake upon rotation of said clip about said fastening means relative to said stake in order to limit rotation of said clip in either direction about a horizontal axis relative to said stade for cantilevered support of the trellis wire on said support portion relative to said side of said stake.*

* * * * *